April 18, 1933.    H. W. MORGAN    1,904,507
NAILING MACHINE
Filed Oct. 17, 1930    3 Sheets-Sheet 1

INVENTOR
Henry W. Morgan
BY
his ATTORNEY

INVENTOR
Henry W. Morgan
BY
his ATTORNEY

Patented Apr. 18, 1933

1,904,507

UNITED STATES PATENT OFFICE

HENRY W. MORGAN, OF BRIGHTON, NEW YORK, ASSIGNOR TO MORGAN MACHINE COMPANY, INC., OF ROCHESTER, NEW YORK, A CORPORATION OF NEW YORK

NAILING MACHINE

Application filed October 17, 1930. Serial No. 489,421.

This invention relates to a nailing machine and particularly to means for positioning work in proper relationship to the nails driven by such a machine. An object of the invention is the provision of simple and satisfactory work positioning means, which may be constructed comparatively inexpensively, and which is not apt to get out of order.

Another object of the invention is the provision of work positioning means which may be used, for example, to position a work piece of relatively small area, such as a cleat, which is beneath a work piece of large area, such as a sheet of veneer, and which is accordingly comparatively inaccessible to the operator of the machine so that it cannot conveniently be positioned by hand.

To these and other ends the invention resides in certain improvements and combinations of parts, all as will be hereinafter more fully described, the novel features being pointed out in the claims at the end of the specification.

In the drawings:

Fig. 6 is a fragmentary view showing details of the operating means for the work positioning members;

Fig. 7 is a section substantially on the line 7—7 of Fig. 1;

Fig. 8 is a vertical section illustrating details of the operating connections for the work positioning members, and Fig. 9 is an inverted perspective view of one of the work positioning fingers.

Similar reference numerals throughout the several views indicate the same parts.

Figure 1:
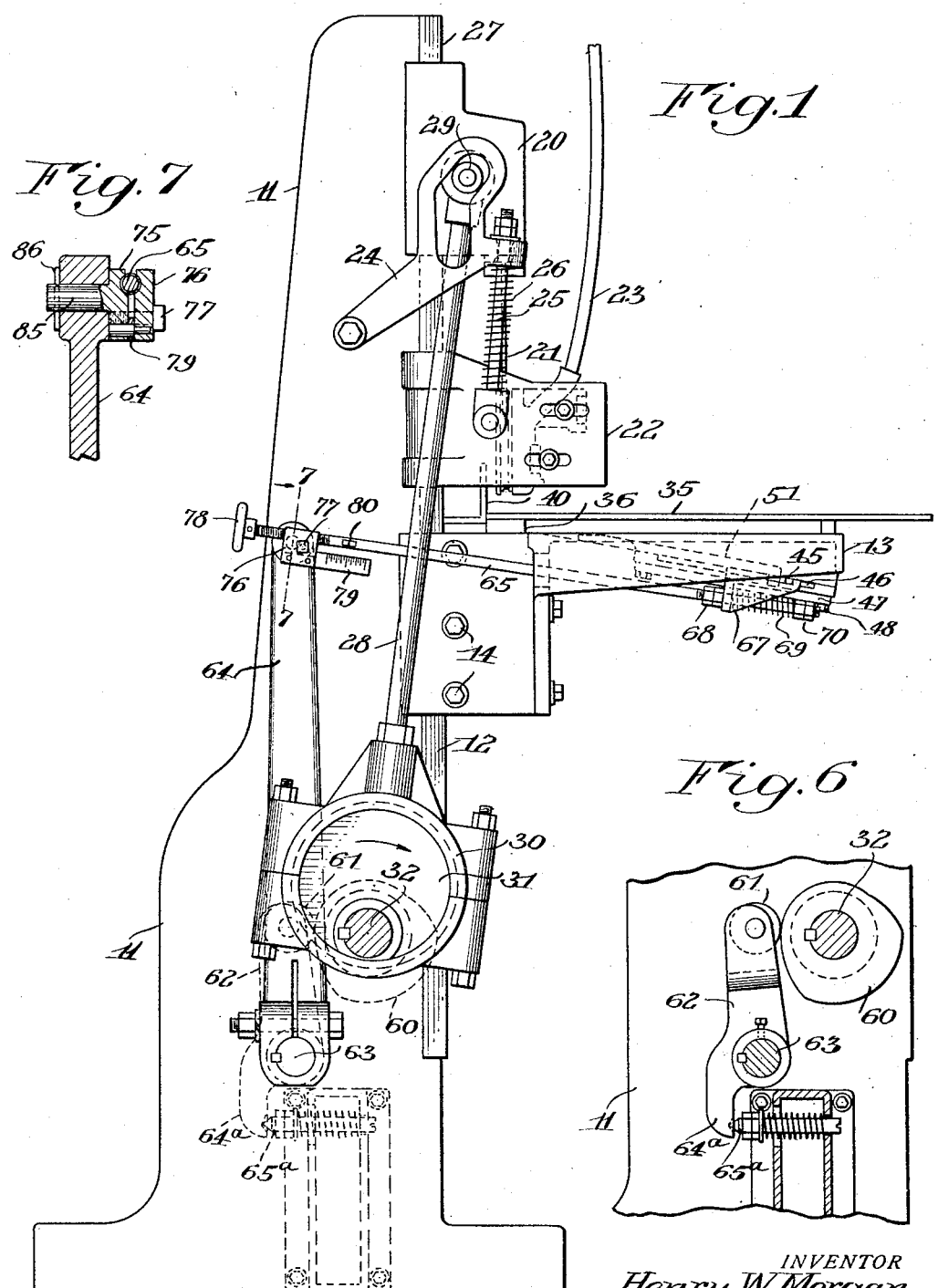
Fig. 1 is a fragmentary end elevation of a nailing machine showing a preferred embodiment of the invention applied thereto, the parts being in their initial position ready for work to be inserted.

There is illustrated in the drawings a preferred embodiment of the invention comprising a machine having a suitable frame including a pair of upright standards 11 having vertical guideways 12. A work support 13 may be adjusted up and down the guideways 12 in accordance with the thickness of the work to be operated upon, and may be held in any desired adjusted position by the clamping bolts 14.

The nailing mechanism includes a nailing head 20 having a series of nail drivers 21, and a nail chuck holding device 22 supplied with nails by tubes 23 leading from a nail hopper. The chuck device 22 is connected to levers 24 by means of a pair of rods 25 surrounded by coiled springs 26.

The nailing head and chuck device are caused to reciprocate up and down vertical guideways 27 by means of a pair of operating links 28, the upper ends of the links being pivoted at 29 to the nailing head 20 and the lower ends of the links being connected to eccentric straps 30 on a pair of eccentrics 31 fixed to a driven shaft 32. When the shaft 32 rotates in a clockwise direction from the position shown in Fig. 1, the links 28 are drawn downwardly and pull down the nailing head 20. The downward movement of the pivots 29 which extend into suitable cam slots in the levers 24 causes these levers to move in a clockwise direction so that the chuck device 22 which is suspended from the levers moves downwardly until it comes into contact with the top of the work to be operated upon, such as the piece of veneer 35 which overlies and is to be nailed to a cleat 36. After the chuck device engages the top of the work and comes to rest thereon, the link 28 is permitted to continue its downward movement, however, by the compression of the springs 26, and thus the driving head 20 is moved on downwardly to the position shown in Fig. 2, during which movement the nail drivers 21 drive the nails into the work.

In many instances it is desired to drive nails through a piece of work of relatively large area, such as the sheet of veneer 35, into a piece of work of relatively small area, such as the cleat or batten 36. The large area of the overlying sheet prevents convenient access to the small work piece beneath the sheet, as is plainly apparent from Fig. 1, so that it is difficult for the operator to position the lower piece satisfactorily by hand. The present invention provides mechanism operable automatically under these circumstances to position the lower work piece in the proper location, which mechanism operates beneath the overlying work piece of relatively large area and does not interfere with the latter.

A suitable back stop 40 is provided against which the material is positioned, this back stop being adjustable in order to vary the location of the nails relative to the edge of the work. When once the back stop has been adjusted to the desired position, pieces of work may be moved rearwardly into contact with it and will then be in proper position for driving nails into them in the desired location.

The work positioning means comprises a bar 45 extending along the work support 13 from a point near one end thereof to a point near the opposite end thereof and guided near each end in a slot 46 formed between a lug on the work support 13 and a guide member 47 secured to the under side of the guiding lug by lag screws 48. The bar 45 has a series of apertures into each of which projects a lug 50 at one end of a work positioning finger 51 of the shape best shown in Figs. 4 and 9. A cotter pin 52 may extend through a hole in the end of each lug beneath the bar 45, to retain the lug of the finger in the aperture in the bar.

The rear end of each positioning finger 51, or end opposite to the portion 50, is beveled as at 53 and extends into a slot 54 formed through the flat top of the work support 13, the rear edge of the slot being beveled or inclined as at 55 to form a surface up which the finger 51 may slide.

Figure 4:
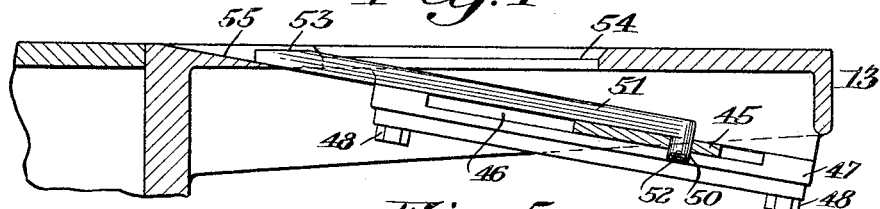
Fig. 4 is a vertical section substantially on the line 4—4 of Fig. 3.
Figure 5:
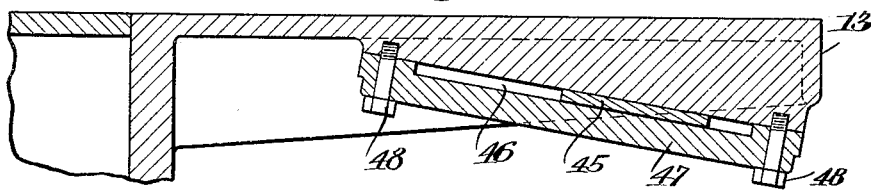
Fig. 5 is a vertical section substantially on the line 5—5 of Fig. 3.

The parts are normally in the position shown in Fig. 4, so that all of the fingers 51 are withdrawn to a position flush with or below the top surface of the work support 13. This position corresponds with the position shown on a somewhat smaller scale in Fig. 1. Now if the bar 45 be moved rearwardly along its guide slots 46, it will carry all of the positioning fingers 51 rearwardly with it, causing these fingers to ride up the inclined ends 55 of the slots 54 so that the rear ends of the fingers will project above the top of the work support and will engage any work lying on the support near the rear edge thereof and shove it rearwardly into engagement with the back stop 40, thus properly positioning the work.

Suitable means is provided for operating the work positioning fingers in timed relation to the operation of the nailing mechanism, so that the work will be positioned preferably before the chuck device 22 comes into contact with it. This operating means, in its preferred form, comprises an operating cam 60 on the driven shaft 32 which operates the nailing mechanism, this cam 60 cooperating with a follower roller 61 on an arm 62 fixed to a shaft 63. The arm 62 has an extension 64a engaged by a spring plunger 65a which tends to move the arm so as to hold the follower roller in engagement with the cam.

When the operating shaft 32 rotates in a clockwise direction from the normal position illustrated in Figs. 1 and 6, the cam 60 operating upon the roller 61 causes the shaft 63 to oscillate in a counter-clockwise direction and this results in counter-clockwise oscillation of a pair of arms 64 fixed to the shaft near the ends thereof. When the arms 64 are thus oscillated, their upper ends move rearwardly and draw rearwardly on links 65 which connect the arms to the bar 45 which carries the work positioning fingers. Thus the work fingers are moved rearwardly by the rotation of the shaft 32.

A resilient connection is provided between the links 65 and the bar 45, so that if the work fingers meet some obstruction preventing further movement thereof, the resilient connection may yield to avoid breakage of the parts. This connection is best illustrated in Fig. 8, by reference to which it will be seen that each link 65 passes through an opening 66 in a bracket 67 secured to the bar 45 near one end thereof. A pair of lock nuts 68 on each link 65 engage the rear side of the bracket 67, while the forward side thereof is engaged by a coiled spring 69 surrounding the link 65 and held in place by a pair of lock nuts 70. Hence when the link 65 moves rearwardly through the predetermined range of movement, spring 69 tends to move the bar 45 through the same range of movement, but if the movement of the bar should be obstructed, the springs 69 may compress so that movement of the bar may stop to avoid breakage or other damage of parts.

The rear end of each link 65 is connected to its arm 64 by means best shown in Figs. 1 and 7. The rear end of each link 65 is provided with screw threads which engage corresponding threads on a block 75 and on a second block 76, the two blocks being held together by a bolt 77 so as to clamp the threads of the link 65 between them. When the bolt 77 is slightly loosened, the link 65 may be rotated by a hand wheel 78 so that the screw threads are effective to adjust the link to a different position relative to the blocks 75 and 76. The adjusted position of the link may be indicated by a graduated scale 79 secured to the block 75 and read in conjunction with an index graduation 80 on the link. When the link has been properly adjusted by rotating the hand wheel 78 in the desired manner, it may be locked in position by tightening the bolt 77 so that accidental rotation of the link is prevented.

In order to permit relative oscillation between the links 65 and the arm 64 when the arm is operated, the threaded block 75 is not fixed to the arm 64 but is provided with a pivot pin 85 extending through a hole in the upper end of the arm 64 and retained therein by means such as the cotter pin 86. Hence the block 75 and with it the block 76 which is secured thereto may oscillate relative to the arm 64.

As previously mentioned, the work support 13 is movable up and down guideways 12 in accordance with the different thicknesses of work to be operated upon. The connection between the operating arm 64 and the work positioning fingers is so constructed as to be effective in all adjusted positions of the work support without interfering with adjustment of the work support through a limited range.

To this end, the opening 66 (Fig. 8) in the bracket 67 through which link 65 extends is made of somewhat larger diameter than the size of the link, so that the link 65 may oscillate to a considerable extent in this opening. Thus when the work support 13 is moved through a limited range of adjustment up or down the guideways 12, the forward end of the link 65 is free to oscillate in the opening 66 to accommodate the link to the new elevation of the work support, while the rear end of the link and the threaded blocks 75 and 76 oscillate about the pivot 85. Oscillation of the front end of the link also occurs to some extent, of course, during each actuation of the apparatus.

In operation, the cleat 36 or other work piece of relatively small area is positioned on the work support 13 adjacent the back stop 40 and the sheet of veneer 35 or other work piece of relatively large area is placed in proper position on it. If the work piece 36 is slightly displaced forwardly from proper position during positioning of the work piece 35, this is wholly immaterial since the automatic positioning means above described will be effective to shift the work piece 36 rearwardly into proper position. A clutch or other driving arrangements is then operated to cause one complete revolution of the driven shaft 32 from the position shown in Fig. 1. This will cause the driving head 20 and the chuck device 22 to move downwardly, and at the same time the cam 60 will oscillate the shaft 63 to swing the arms 64 rearwardly, pulling rearwardly on the links 65 and the bar 45 and thus shifting all of the work positioning fingers 51 rearwardly and upwardly so that they engage the work piece 36 and move it against the back stop 40 in case it is not already positioned against the back stop. This movement of the work positioning means is completed preferably prior to the time that the chuck device 22 comes into contact with the work, so that the work positioning means will not have to operate against the friction which would be caused by contact of the chuck device.

Figure 2:
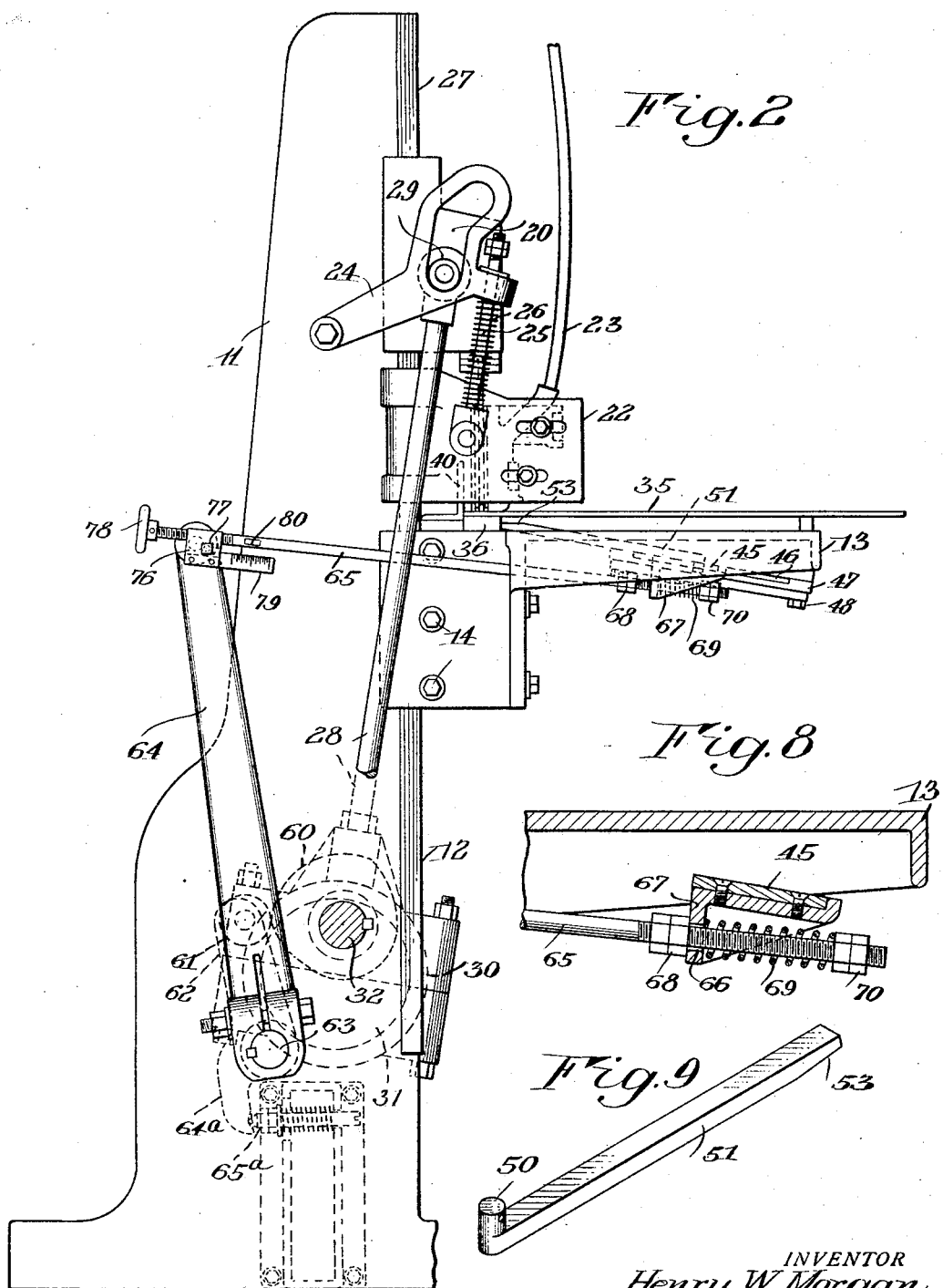
Fig. 2 is a similar view of the mechanism shown in Fig. 1 with the work positioned on the machine and nails being driven therein.
Figure 3:
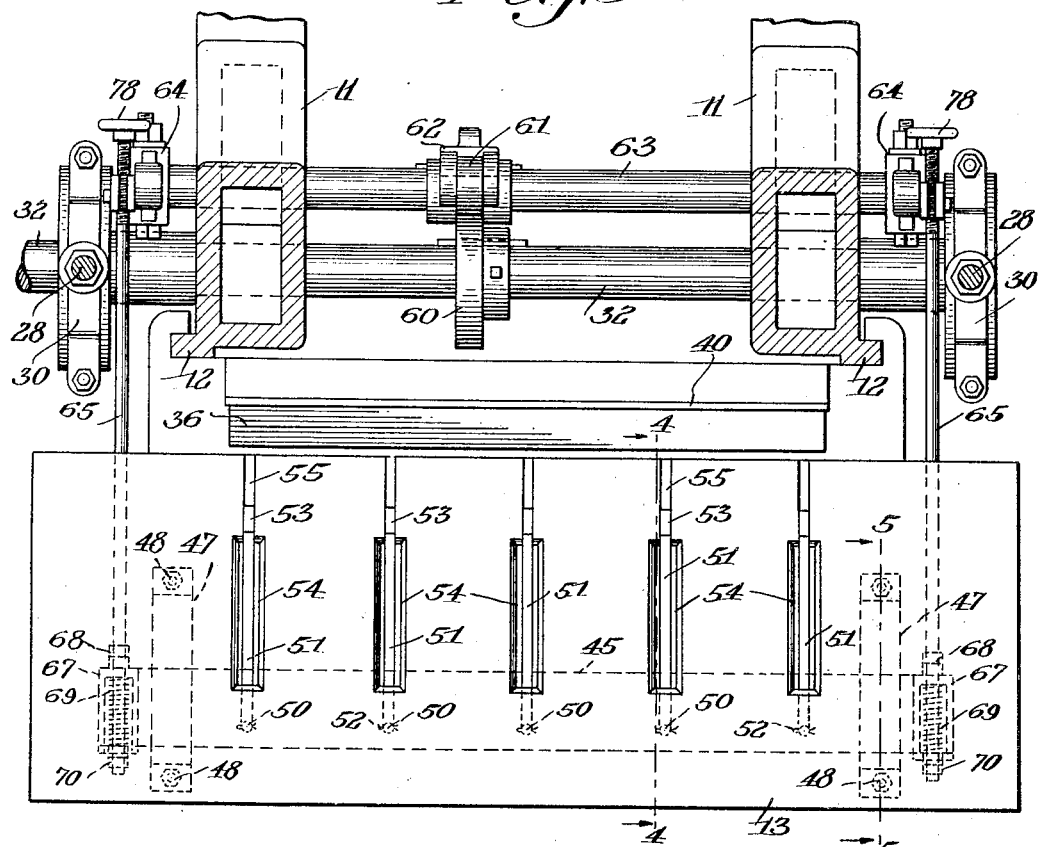
Fig. 3 is a plan of the apparatus with parts in section.

A dwell on the cam 60 holds the work positioning means in the effective position illustrated in Fig. 2 while the chuck device 22 and driving head 20 complete their downward movement, movement of the latter being effective to drive nails through the upper work piece 35 into the lower work piece 36. When the driving has been completed the cam releases the work positioning mechanism, which then moves forwardly to its initial position of rest under the influence of the spring plunger 65, aided somewhat by gravity since the slots 46 are inclined downwardly in a forward direction. As the work positioning fingers move forward, the driving head 20 and chuck device 22 are elevated again to the initial position shown in Fig. 1, and the nailed work pieces may be removed and other work pieces to be nailed may be substituted therefor.

While one embodiment of the invention has been disclosed, it is to be understood that the inventive idea may be carried out in a number of ways. This application is therefore not to be limited to the precise details disclosed, but is intended to cover all variations and modifications thereof falling within the spirit of the invention or the scope of the appended claims.

I claim:

1. In a nailing machine, the combination with a work supporting table provided with a slot having an inclined end, of nailing mechanism for driving nails into work held on said table, and work positioning means including a part lying at one time substantially within said slot and shiftable from such position to ride up said inclined end of said slot to a position projecting above said table for engaging a piece of work to position it accurately with respect to said nailing mechanism.

2. In a nailing machine, the combination with a work support having a plurality of slots, of nailing mechanism for driving nails into work held on said support, a series of work positioning fingers having portions thereof adapted to be moved into and out of said slots, and means including a resilient member for shifting all of said fingers concomitantly to engage the work to position it with respect to said nailing mechanism.

3. In a nailing machine, the combination with a work support having a plurality of slots, of nailing mechanism for driving nails into work held on said support, a series of substantially parallel work positioning fingers having portions thereof adapted to be moved into and out of said slots, and means operating in timed relationship with said nailing mechanism for yieldably shifting all of said fingers concomitantly to engage the work to position it with respect to said nailing mechanism.

4. In a nailing machine, the combination with a frame, of a work support adjustable relative to said frame, work positioning means reciprocally mounted on said work support substantially in the plane thereof and movable bodily therewith when said support is adjusted, mechanism mounted on said frame for operating said work positioning means, and yieldable connecting means for operatively connecting said operating mechanism to said positioning means while permitting limited adjustment of said work support.

5. In a nailing machine, the combination with a work support, of nailing mechanism for driving nails into work held on said support, an arm operable in timed relation with said nailing mechanism, work positioning means movable in slots formed in said support and engaging work on said support to position such work, and yieldable connection between said arm and said positioning means to operate the latter from the former, said connection being adjustable so that the position of said positioning means may be varied relative to said arm.

6. In a nailing machine, the combination with a work support, of nailing mechanism for driving nails into work held on said support, movable means mounted on said support for engaging and positioning work held on said support, said movable means extending from a point adjacent one side of said support to a point adjacent another side thereof, a pair of arms substantially in the plane of said support, one adjacent one side of said work support and the other adjacent another side thereof, a yieldable operative connection between each of said arms and said movable means, and means for operating said arms in timed relation to said nailing mechanism.

7. In a nailing machine, the combination with a work supporting table provided with a slot having an inclined end, of nailing mechanism for driving nails into work held on said table, work positioning means including a part lying at one time substantially within said slot and shiftable from such position to ride up said inclined end of said slot to a position projecting above said table for engaging a piece of work to position it accurately with respect to said nailing mechanism, and mechanism for adjusting said positioning means relative to said support.

8. In a nailing machine, the combination of a support formed to provide an inclined slot, of nailing mechanism for driving nails into work held on said support, a work positioning member having a portion retractable in said slot to a position substantially beneath the surface of said support and movable in said slot to an effective position projecting above the surface of the support for engaging work supported thereby, mechanism for reciprocating said positioning member in said slot, and a resilient member connecting said positioning member to said mechanism.

9. In a nailing machine, the combination with work supporting means having stop means thereon for the work, of nailing mechanism for driving nails into the work, work engaging means normally spaced laterally from the work at a point below the surface of the supporting means, and means including an operating device for moving the work engaging means in a vertical direction and simultaneously reciprocating it transversely of said direction to cause it to move into engagement with the work and to be withdrawn therefrom to normal position below the surface of the supporting means, said operating device moving in timed relation to the operation of the nailing mechanism.

10. In a nailing machine, the combination with a frame, a work support adjustable on the frame and having stop means for the work, of nailing mechanism for driving nails into the work, work engaging and positioning means normally spaced laterally from the work at a point below the surface of the support and movable bodily with the support upon adjustment of the latter upon the frame, and means including an operating device for moving the work engaging means in a vertical direction and simultaneously reciprocating it transversely of said direction to cause it to move into engagement with the work and to be withdrawn therefrom to normal position below the surface of the support, said operating device moving in timed relation to the operation of the nailing mechanism.

HENRY W. MORGAN.